US008678548B2

(12) United States Patent
Tamada et al.

(10) Patent No.: US 8,678,548 B2
(45) Date of Patent: Mar. 25, 2014

(54) IMAGE RECORDING APPARATUS

(75) Inventors: Hisashi Tamada, Nagoya (JP); Keiji Kura, Nagoya (JP); Yusuke Suzuki, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 69 days.

(21) Appl. No.: 13/013,066

(22) Filed: Jan. 25, 2011

(65) Prior Publication Data

US 2011/0205298 A1    Aug. 25, 2011

(30) Foreign Application Priority Data

Feb. 25, 2010  (JP) ................. 2010-040361

(51) Int. Cl.
*B41J 29/38* (2006.01)
*B41J 29/393* (2006.01)
*B41J 13/32* (2006.01)
*B41J 11/52* (2006.01)
*B41J 19/20* (2006.01)
*B41J 2/505* (2006.01)
*G06K 15/10* (2006.01)

(52) U.S. Cl.
CPC ............ *B41J 19/202* (2013.01); *B41J 2/5056* (2013.01); *G06K 15/105* (2013.01); *B41J 2/505* (2013.01)
USPC ................................. 347/37; 347/4

(58) Field of Classification Search
CPC ....... B41J 2/505; B41J 2/5056; G06K 15/105
USPC ........................ 347/37, 4; 271/184
See application file for complete search history.

(56) References Cited

U.S. PATENT DOCUMENTS

| 5,045,869 | A | * | 9/1991 | Isaka et al. | 347/254 |
| 5,217,217 | A | * | 6/1993 | Matsumoto | 271/9.08 |
| 5,301,936 | A | * | 4/1994 | Matsumoto | 271/9.05 |
| 5,326,089 | A | * | 7/1994 | Toyoda | 271/162 |

(Continued)

FOREIGN PATENT DOCUMENTS

| JP | 5330699 | 12/1993 |
| JP | 6189061 | 7/1994 |

(Continued)

OTHER PUBLICATIONS

Notice of Reasons for Rejection for Japanese Patent Application No. 2010-040361 dated Apr. 23, 2013.

*Primary Examiner* — Stephen Meier
*Assistant Examiner* — Alexander D Shenderov
(74) *Attorney, Agent, or Firm* — Frommer Lawrence & Haug LLP

(57) ABSTRACT

An image recording apparatus includes: a recording head which records an image to a recording surface of a recording medium; a scanning mechanism which reciprocates the recording head along a scanning direction; a recording direction deciding unit which decides a recording direction along which the recording head scans with respect to the recording surface of the recording medium to record the image, from a first direction along the recording surface and a second direction intersecting with the first direction and along the recording surface; and a changing unit which changes one of the scanning direction of the recording head and a direction of the recording medium to bring the recording direction with respect to the recording surface decided by the recording direction deciding unit and the scanning direction of the recording head in line.

11 Claims, 10 Drawing Sheets

(56) References Cited

U.S. PATENT DOCUMENTS

| | | | |
|---|---|---|---|
| 5,517,317 A | 5/1996 | Kumada | |
| 5,550,623 A * | 8/1996 | Tomita et al. | 399/83 |
| 5,604,597 A * | 2/1997 | Imai | 358/296 |
| 6,196,660 B1 * | 3/2001 | Park | 347/37 |
| 6,416,147 B1 * | 7/2002 | Li et al. | 347/9 |
| 6,912,063 B1 | 6/2005 | Yamamoto et al. | |
| 6,935,738 B2 * | 8/2005 | Lorenz et al. | 347/104 |
| 2003/0035022 A1 | 2/2003 | Otsuki | |
| 2005/0063666 A1 * | 3/2005 | Takatsuka | 386/46 |
| 2008/0259101 A1 * | 10/2008 | Kurita et al. | 347/1 |
| 2009/0201530 A1 * | 8/2009 | Bustamante | 358/1.15 |

FOREIGN PATENT DOCUMENTS

| | | |
|---|---|---|
| JP | 5016437 | 1/1996 |
| JP | H10-166561 | 6/1998 |
| JP | H10-166625 | 7/1998 |
| JP | 2001-121689 | 5/2001 |
| JP | 2001-191550 | 7/2001 |
| JP | 2003118097 | 4/2003 |
| JP | 2006-137161 | 6/2006 |
| JP | 2007196446 | 8/2007 |

* cited by examiner

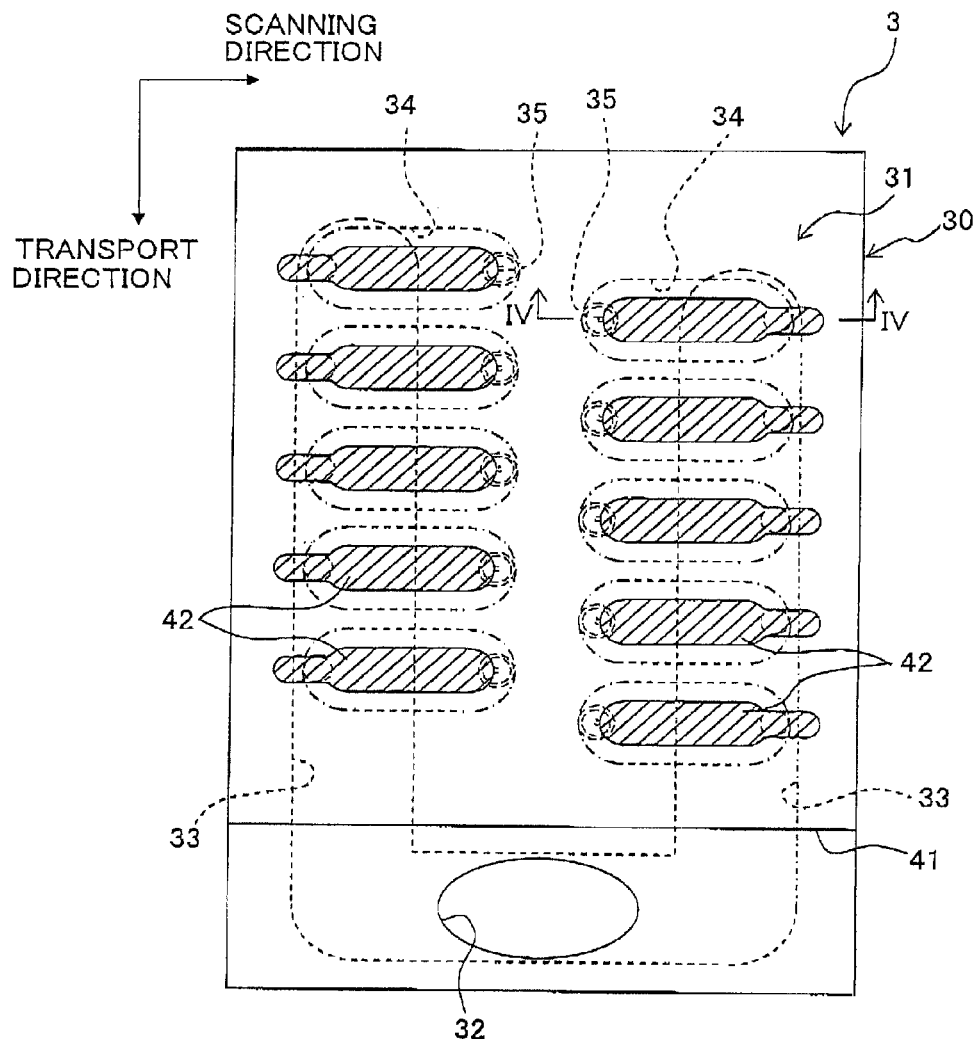

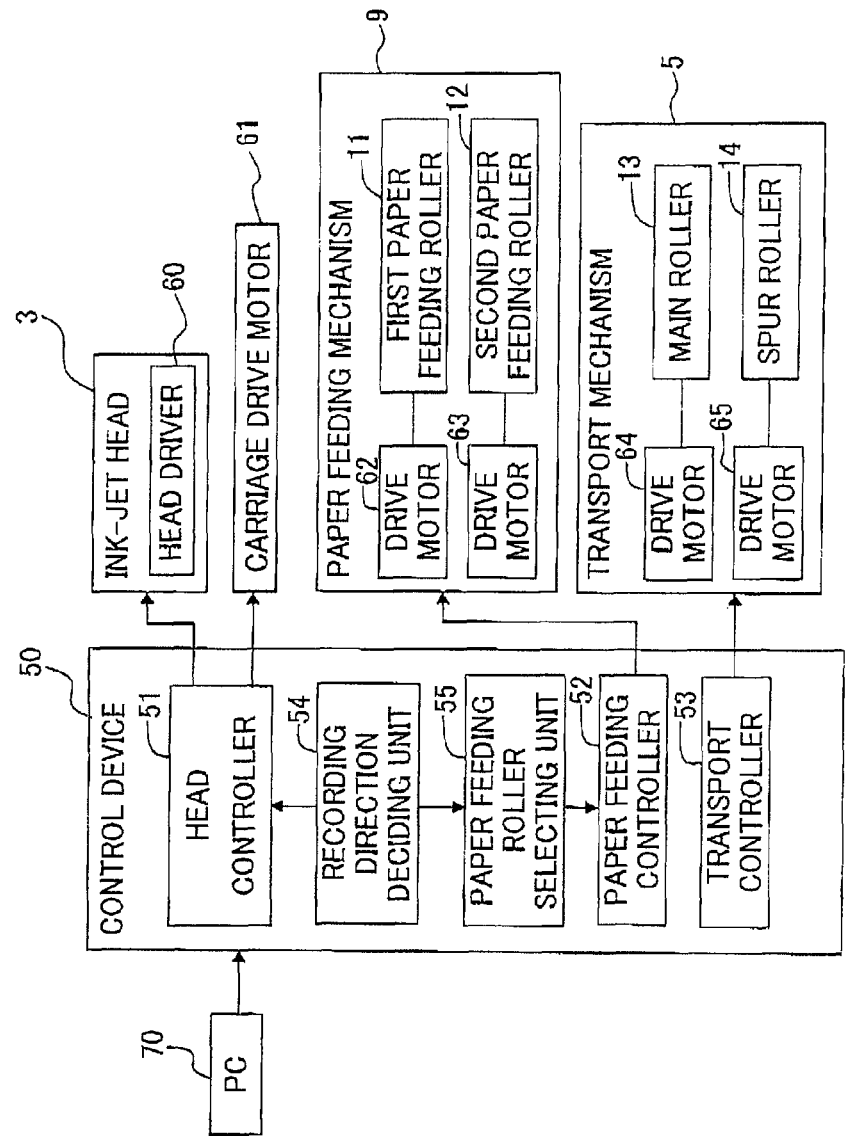

IMAGE RECORDING APPARATUS

CROSS REFERENCE TO RELATED APPLICATION

The present application claims priority from Japanese Patent Application No. 2010-040361, filed on Feb. 25, 2010, the disclosure of which is incorporated, herein by reference in, its entirety.

BACKGROUND OF THE INVENTION

1. Field of the Invention

The present invention relates to an image recording apparatus recording an image to a recording surface of a recording medium.

2. Description of the Related Art

Typical image recording apparatuses include a recording head which is mounted on a carriage reciprocatable across a recording medium such as a recording paper in a predetermined scanning direction and which records an image on a recording surface of the recording medium. As such an image recording apparatus, US Patent Application Laid-open Publication No, 2003/0035022 A1 (corresponds to Japanese Patent Application Laid-open No. 2003-118097), for instance, discloses an ink-jet printer including: an ink-jet head which is mounted on a carriage reciprocatable in a scanning direction and which jets ink from a plurality of nozzles; and a transport mechanism transporting a recording medium in a transport direction perpendicular to the scanning direction.

This printer alternately repeats an operation in which the ink-jet head jets the ink onto the recording surface of the recording medium while moving in the scanning direction and an operation in which the recording medium is transported in the transport direction by a predetermined amount, thereby recording a desired image on the recording surface of the recording medium. Further, some image has a blank area in which no dot is formed on the recording medium. When this blank area extends all along the scanning direction of the ink-jet head, a pass across this area is skipped because the scanning across this area by the ink-jet bead is a waste of the recording time.

In image recording apparatuses represented by the above-described ink-jet printer described in US Patent Application Laid-open Publication No. 2003/0035033 A1, the scanning direction of the recording head with respect to the recording surface is fixed and whatever image data is, an image recording direction on the recording surface is the same. Therefore, for example, even when an image is recorded to only part of some area of the recording paper in the scanning direction of the recording head, a pass is performed for this area, so that the recording time becomes long depending on image data.

SUMMARY OF THE INVENTION

Therefore, it is an object of the present invention to provide an image recording apparatus capable of high-speed image recording on a recording surface of a recording medium whatever image data is.

According to an aspect of the present invention, there is provided an image recording apparatus which records an image on a recording medium, the apparatus including: a recording head which records the image to a recording surface of the recording medium; a scanning mechanism which reciprocates the recording head along a scanning direction; a recording direction deciding unit which decides a recording direction along which the recording head scans with respect to the recording surface of the recording medium to record the image, from a first direction along the recording surface and a second direction intersecting with the first direction and along the recording surface; and a changing unit which changes one of the scanning direction of the recording head and a direction of the recording medium to bring the recording direction with respect to the recording surface decided by the recording direction deciding unit and the scanning direction of the recording head in line, and the recording direction deciding unit calculates a first recording time taken for recording the image when the first direction is set as the recording direction and a second recording time taken for recording the image when the second direction is set as the recording direction, based on image data of the image to be recorded on the recording surface of the recording medium; and the recording direction deciding unit decides the first direction as the recording direction when the first recording time is shorter than the second recording time, and decides the second direction as the recording direction when the second recording time is shorter than the first recording time.

According to the image recording apparatus of the present invention, the recording direction deciding unit calculates a first recording time taken for recording the image when the first direction is decided as the recording direction and a second recording time taken for recording the image when the second direction is decided as the recording direction based on the image data of the image, and the recording direction deciding unit decides the first direction as the recording direction when the first recording time is shorter than the second recording time, and decides the second direction as the recording direction when the second recording time is shorter than the first recording time. The recording direction and the scanning direction of the recording head are brought in line, and the recording head scans in the scanning direction, whereby the image is recorded on the recording surface of the recording medium. Consequently, it is possible to make the recording head scan in the optimum recording direction to the recording surface according to the image data, which enables high-speed image recording on the recording surface of the recording medium whatever the image data is.

BRIEF DESCRIPTION OF THE DRAWINGS

FIG. 3 is a plane view of an ink-jet head;

FIG. 5 is a block diagram showing an electric configuration of the printer;

DETAILED DESCRIPTION OF THE PREFERRED EMBODIMENTS

First embodiment of the present invention will be explained. In this embodiment, the present invention is applied to an ink-jet printer which jets ink onto a recording paper from an ink-jet head to record a desired image on the recording paper.

Figure 1:
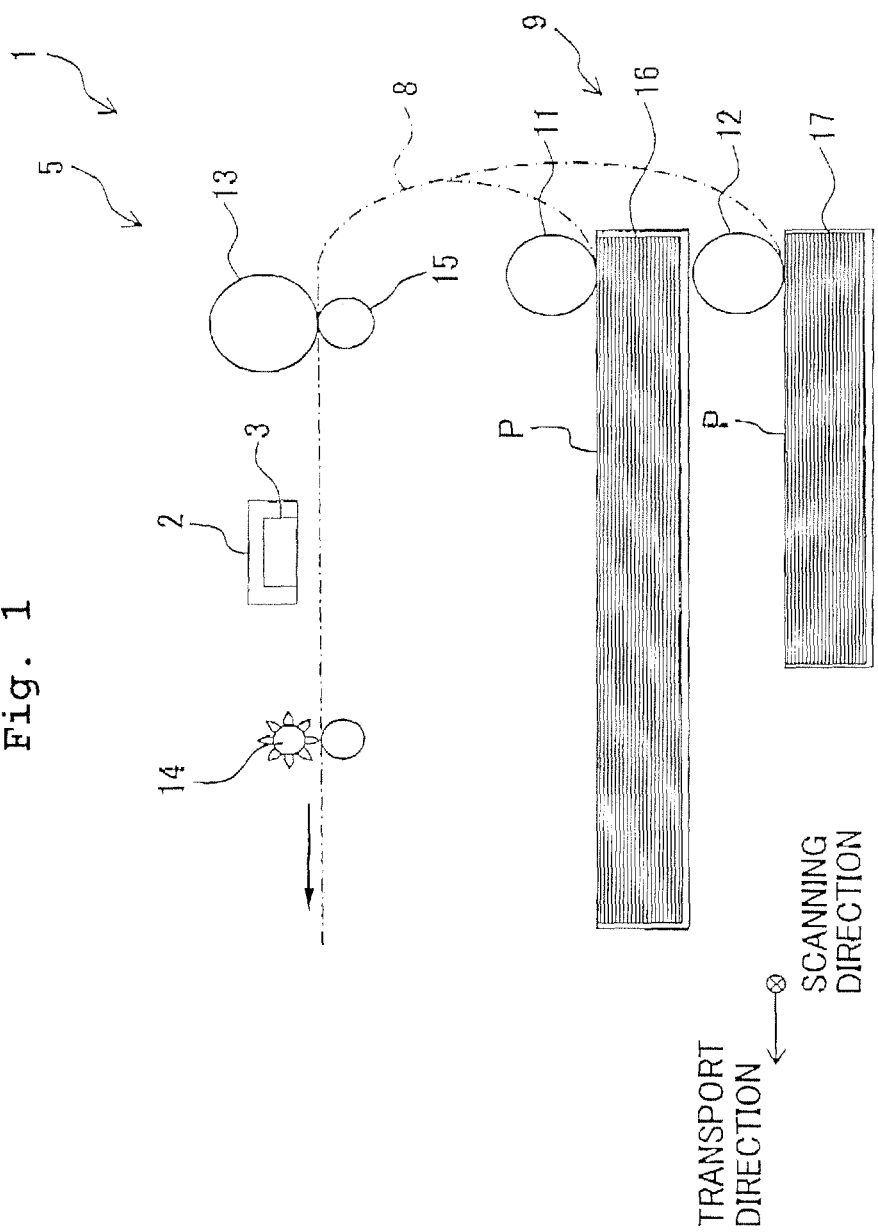
FIG. 1 is a side view showing a schematic structure of a printer according to a first embodiment.
Figure 2A:
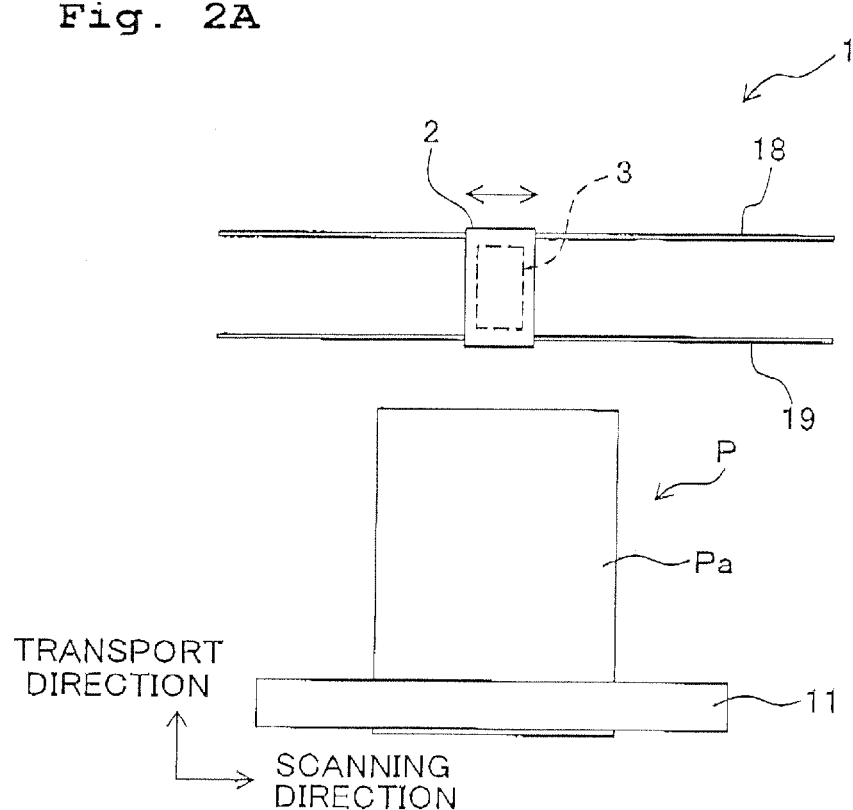
FIG. 2A is a plane view of the printer in FIG. 1 when a recording paper is transported in a longitudinal direction of the recording paper.
Figure 2B:
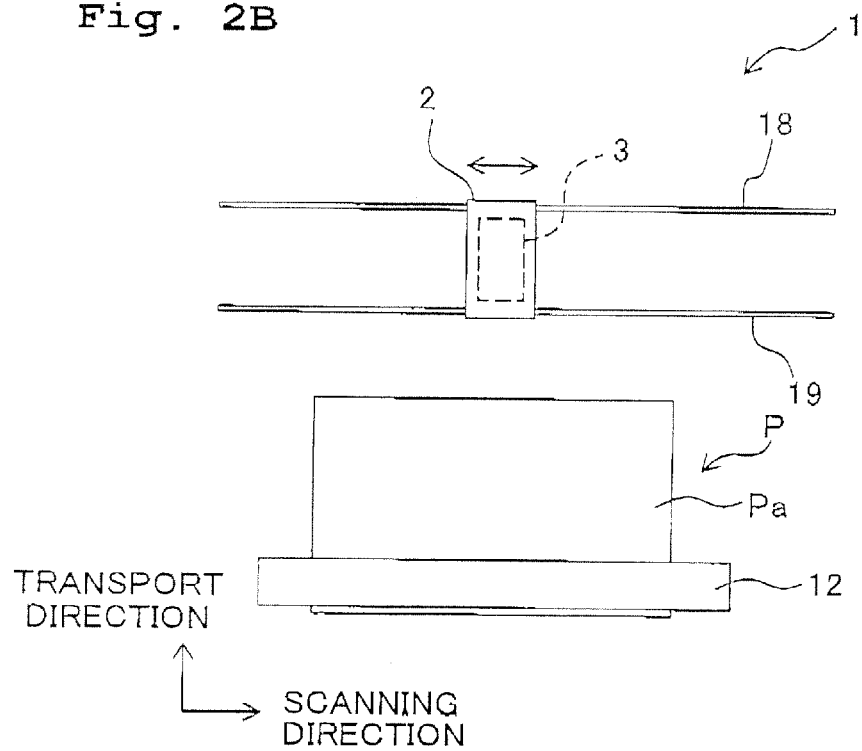
FIG. 2B is a plane view of the printer in FIG. 1 when the recording paper is transported in a short direction of the recording paper.

As shown in FIG. 1 and FIGS. 2A, 2B, an ink-jet printer 1 (image recording apparatus: hereinafter, referred to simply as a printer 1) includes a carriage 2 (scanning mechanism), an ink-jet head 3 (recording head), a transport mechanism 5, and a paper feeding mechanism 9. In FIG. 2A, a roller 11 shown in FIG. 1 and a recording paper P fed by the roller 11 are shown, and the illustration of various kinds of rollers 12 to 15, a recording paper P fed by the roller 12, and so on is omitted. Further, in FIG. 2B, the roller 12 shown in FIG. 1 and the recording paper P fed by the roller 12 are shown, and the illustration of various kinds of the rollers 11, 13 to 15 and the recording paper P fed by the roller 11 is omitted. As shown in FIG. 5, the printer 1 further includes a control device 50 which controls the whole printer 1, and so on.

The carriage 2 reciprocates in a right and left direction (scanning direction) in FIGS. 2A and 2B along two guide shafts 18, 19. The ink-jet head 3, which is attached on a lower surface of the carriage 2, reciprocates in the scanning direction integral with the carriage 2 and jets ink from nozzles 35 (see FIG. 4) formed on its lower surface.

Figure 4:
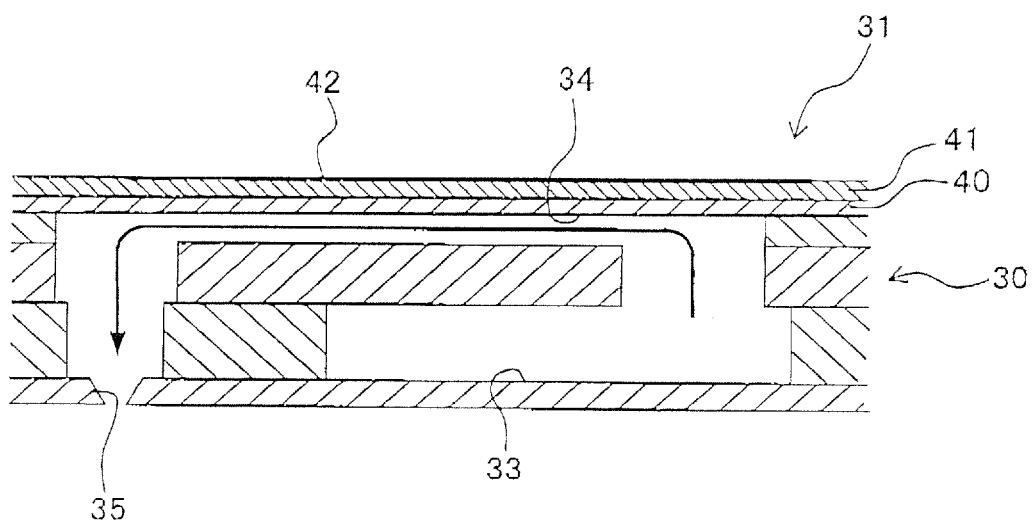
FIG. 4 is a cross-sectional view taken along IV-IV line in FIG. 3.

As shown in FIG. 3 and FIG. 4, the ink-jet head 3 includes a channel unit 30 in which ink channels are formed and an actuator unit 31 of a piezoelectric type which applies a jetting pressure to the ink in the ink channels.

The channel unit 30 has: an ink supply port 32 connected to an ink cartridge (not shown); manifolds 33 branching from the ink supply port 32 to extend along an up and down direction (transport direction) in FIG. 3 perpendicular to the scanning direction; a plurality of pressure chambers 34 communicating with the manifolds 33; and the nozzles 35 communicating with the pressure chambers 34 respectively. As shown in FIG. 3, there are two manifolds 33, and the pressure chambers 34 and the nozzles 35 are arranged in zigzag and form two pressure chamber rows and two nozzle rows which correspond to the two manifolds 33, respectively.

The actuator unit 31 includes a vibration plate 40 joined to the channel unit 30 so as to cover the pressure chambers 34, a piezoelectric layer 41 disposed on an upper surface of the vibration plate 40, and a plurality of individual electrodes 42 provided on an upper surface of the piezoelectric layer 41 so as to correspond to the pressure chambers 34, respectively. When a predetermined driving pulse signal is supplied from a head driver 60 (see FIG. 5) to the individual electrodes 42, the actuator unit 31 causes bending deformation in the vibration plate 40 by utilizing a piezoelectric distortion occurring in the piezoelectric layer 41. When there occurs the bending deformation of the vibration plate 40, volumes of the pressure chambers 34 change and accordingly a pressure is applied to each of the ink in the pressure chambers 34, so that the ink is jetted from the nozzles 35 communicating with the pressure chambers 34.

Returning to FIG. 1 and FIGS. 2A, 2B, the transport mechanism 5 includes a main roller 13 and a spur roller 14 which are arranged to sandwich the ink-jet head 3 in the transport direction, drive motors 64, 65 (see FIG. 5) which drive the rollers 13, 14 respectively, and so on, and the transport mechanism S transports a rectangular recording paper P (recording medium) having long sides and short sides along a paper transport route 8 (shown by the dashed line in FIG. 1). By the cooperation of the main roller 13 and a pressing roller 15, the transport mechanism 5 transports the recording paper P in the transport direction from the right side in FIG. 1 toward the ink-jet head 3 and by the operation of the spur roller 14, the transport mechanism 5 discharges the recording paper P on which an image, characters, and so on have been recorded by the ink-jet head 3 to a discharge tray (not shown) on the left side in FIG. 1.

The paper feeding mechanism 9, which is disposed under the transport mechanism 5, includes a first paper feeding tray 16 (first feeding tray) capable of housing stacked recording papers P, the first paper feeding roller 11 sending out one of the recording papers P from the first paper feeding tray 16, a second paper feeding tray 17 (second feeding tray) disposed under the first paper feeding tray 16 and capable of housing stacked recording papers P, the second paper feeding roller 12 whose axis is parallel to an axis of the first paper feeding roller 11 and which sends out the recording paper P from the second paper feeding tray 17, drive motors 62, 63 (see FIG. 5) which drive the rollers 11, 12 respectively, and so on, and the paper feeding mechanism 9 feeds one of the recording papers P to the paper transport route 8. Note that the two paper feeding rollers 11, 12 and the drive motors 62, 63 which drive these rollers 11, 12 respectively in this embodiment correspond to a feeding mechanism in the present invention.

In the first paper feeding tray 16, the recording papers P whose short direction is set parallel to the axis of the first paper feeding roller 11 are accommodated. The first paper feeding roller 11 comes into contact with the uppermost recording paper P out of the recording papers P accommodated in the first paper feeding tray 16 while rotating, thereby feeding the recording paper P to the paper transport route 8. The fed recording paper P is transported in long-edge feed along the paper transport route 8 so that a longitudinal direction thereof becomes the transport direction, and undergoes the scanning by the ink-jet head 3 in the short direction.

The second paper feeding tray 17 accommodates the recording papers P whose direction in terms of a plane direction is different from the direction of the recording papers P accommodated in the first paper feeding tray 16 by 90 degrees, with a longitudinal direction thereof set parallel to the axis of the second paper feeding roller 12. The second paper feeding roller 12 comes into contact with the uppermost recording paper P out of the recording papers P housed in the second paper feeding tray 17 while rotating, thereby feeding the recording paper P to the paper transport route 8. The fed recording paper P is transported in short-edge feed along the paper transport route 8 so that its short direction becomes the transport direction, and undergoes the scanning by the ink jet head 3 in the longitudinal direction.

Thus, two kinds of the recording papers P, though being the same recording papers P, whose directions relative to the transport direction differ by 90 degrees depending on the paper feeding trays feeding the recording papers are fed to the paper transport route 8. Then, according to the direction of the recording paper P fed to the paper transport route 8, the scanning direction of the ink-jet head 3 becomes the direction matching the short direction or the longitudinal direction of a recording surface Pa of the recording paper P, which means that a recording direction in which the ink-jet head 3 scans across the recording surface Pa and records an image is changed.

Next, an electric configuration of the printer 1, mainly, that of the control device 50, will be explained with reference to the block diagram in FIG. 5. The control device 50 of the printer 1 shown in FIG. 5 includes a CPU (Central Processing Unit), a ROM (Read Only Memory) in which various programs, data, and so on for controlling the whole operation of the printer 1 are stored, a RAM (Random Access Memory) in which data and so on processed by the CPU are temporarily stored, and so on.

As shown in FIG. 5, the control device 50 has a head controller 51, a paper feeding controller 52, a transport controller 53, a recording direction deciding unit 54, and a paper feeding roller selecting unit 55 (changing unit). Functions of the head controller 51, the paper feeding controller 52, the transport controller 53, the recording direction deciding unit 54, and the paper feeding roller selecting unit 55 are executed by the CPU executing various kinds of control programs stored in the ROM of the control device 50.

Based on image data inputted from a PC 70 and a signal relating to a recording direction (to be described later) inputted from the recording direction deciding unit 54, the head controller 51 sends a control signal to the head driver 60 which drives the actuator unit 31 of the ink-jet head 3 and to a carriage drive motor 61 which drives the carriage 2, thereby controlling the reciprocating scanning of the ink jet head 3.

Based on an image recording start signal inputted from the PC 70 and a paper feeding roller selection signal (to be described later) inputted from the paper feeding roller selecting unit 55, the paper feeding controller 52 sends a control signal to the drive motors 62, 63 of the paper feeding mechanism 9 to control the feeding of the recording paper P to the paper transport route 8 by the first paper feeding roller 11 and the second paper feeding roller 12.

Based on the image data inputted from the PC 70 and the signal relating to the recording direction (to be described later) inputted from the recording direction deciding unit 54, the transport controller 53 sends a control signal to the drive motors 64, 65 of the transport mechanism 5 to control the transport of the recording paper P by the main roller 13 and the spur roller 14.

In the printer 1 of this embodiment, at the time of the image recording, first, the head controller 51 makes the nozzles 35 jet the ink to the recording surface Pa of the recording paper P by controlling the head driver 60 of the ink-jet head 3 while making the ink-jet head 3 scan to one side in the scanning direction by controlling the carriage drive motor 61. Next, when the scanning direction of the ink-jet head 3 is reversed from rightward to leftward, the transport controller 53 controls the transport mechanism 5 to transport the recording paper P in the transport direction by a predetermined amount. When the scanning direction of the inkjet head 3 is reversed, the nozzles 35 jet the ink to the recording surface Pa of the recording paper P while the ink-jet head 3 is made to scan to the other side in the scanning direction. Then, the printer 1 performs bi-directional printing in which a desired image is recorded on the recording surface Pa of the recording paper P by alternately repeating the operation of jetting the ink to the recording surface Pa of the recording paper P while moving the ink-jet head 3 in the scanning direction and the operation of transporting the recording paper P in the transport direction by a predetermined amount. It should be noted that this embodiment is applicable not only to the bi-directional printing but also to unidirectional printing in which an image is recorded at the time of the scanning to one direction in the scanning direction.

Figure 6A:
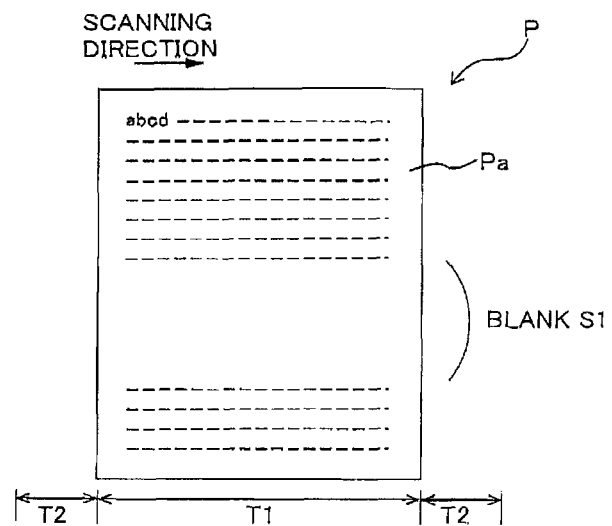
FIGS. 6A and 6B are views used to explain a recording time to the recording paper, FIG. 6A showing a case where the recording paper is transported in the longitudinal direction and FIG. 6B showing a case where the recording paper is transported in the short direction.

Here, when the recording paper P is fed from the first paper feeding tray 16, the recording paper P is transported in long-edge feed, with the longitudinal direction of the recording surface Pa set parallel to the transport direction. Then, as shown in FIG. 6A, the ink-jet head 3 scans along the short direction of the recording surface Pa of the recording paper P. At this time, the time taken for the ink-jet head 3 to scan one way (one pass) is the sum of a time T1 taken for the ink-jet head 3 to scan all along a width of the recording paper P at a uniform speed and a time T2 taken for the ink-jet head 3 to accelerate and decelerate in areas outside the recording paper P. The speed during the uniform-speed scanning is decided by resolution of an image and a jetting cycle of the ink jetted from the ink jet head 3, and for example, under the constant jetting cycle, the higher the resolution, the lower the speed and the longer the time taken for one pass.

Figure 6B:
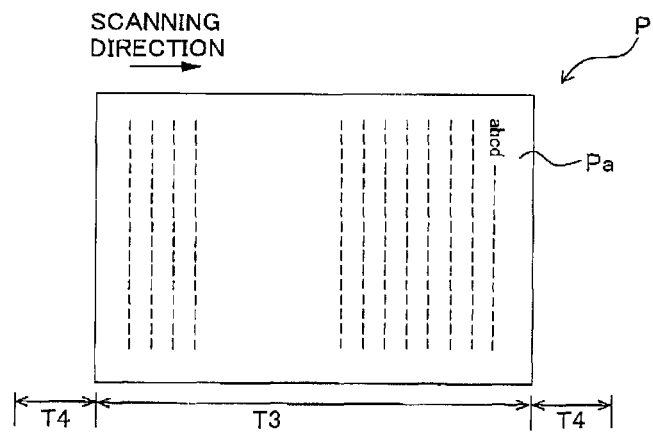

On the other hand, when the recording paper P is fed from the second paper feeding tray 17, this recording paper P is transported in short-edge feed, with the short direction of the recording surface Pa set parallel to the transport direction. Then, as shown in FIG. 6B, the ink-jet head 3 scans along the longitudinal direction of the recording surface Pa of the recording paper P. At this time, the time taken for the ink jet head 3 to make one pass is the sum of a time. T3 taken for the ink jet head 3 to scan all along a width of the recording paper P at a uniform speed and a time T4 taken for the ink-jet head 3 to accelerate and decelerate in areas outside the recording paper P. At this time, the time taken for the scanning at the uniform speed is proportional to the width of the recording paper P, and the time taken for the ink-jet head 3 to accelerate and decelerate is decided by the speed during the uniform-speed scanning and the acceleration. Therefore, if the speed during the uniform-speed scanning is the same, the time T1 taken for the ink-jet head 3 to scan in the short direction of the recording surface Pa at the uniform speed is shorter than the time T3 taken for the ink-jet head 3 to scan in the longitudinal direction of the recording surface Pa at the uniform speed. Further, if the speed during the uniform-speed scanning and the acceleration during the acceleration/deceleration are the same, the time T2 and the time T4 are equal irrespective of the paper width. Therefore, the time taken for one pass when the ink-jet head 3 scans in the short direction of the recording surface Pa is shorter than the time taken for one pass when the ink-jet head 3 scans in the longitudinal direction of the recording surface Pa.

Further, as shown in FIG. 6A, for example, if an area where no image is to be recorded all along the short direction of the recording surface Pa is formed as a blank S1 at a substantially longitudinal center, an area in which no dot is to be formed by the ink jetted from the ink-jet head 3 exists when the ink-jet head 3 scans in the short direction of the recording surface Pa. For such an area, the ink-jet head 3 skips the scanning without performing a pass, and the recording paper P is transported in the transport direction by a predetermined amount. That is, for an area in which no dot is to be formed by the jetted ink all along the scanning direction, the ink-jet head 3 skips the scanning without performing a pass. Consequently, the number of passes in which the ink jet head 3 scans is reduced, resulting in a shorter time taken for the image recording.

Generally, when an image which requires the scanning across the whole area by the ink-jet head 3 is recorded on a rectangular recording surface Pa having long sides and short sides such as of the recording paper P, transporting the recording paper P with the short direction of the recording surface Pa set parallel to the transport direction and moving the ink-jet head 3 in the longitudinal direction of the recording surface Pa reduces the number of passes, which accordingly reduces the time-consuming reversing operation of the ink-jet head 3 (operation of reversing the scanning direction) and reduces the image recording time, though requiring a longer time for one pass. However, if the image has a blank, the number of passes in which the ink-jet head 3 scan changes. Therefore, it differs depending on each image which of the scanning in the longitudinal direction or the scanning in the short direction of the recording surface Pa of the recording paper P by the ink jet head 3 results in a shorter recording time.

Therefore, in this embodiment, the control device 50 has the recording direction deciding unit 54 and the paper feeding roller selecting unit 55 in addition to the head controller 51, the paper feeding controller 52, and the transport controller 53. Based on image data inputted from the PC 70, the recording direction deciding unit 54 calculates a first recording time taken for recording an image from the number of passes in which the ink-jet head 3 scans and the time taken for one pass when the longitudinal direction (first direction) of the recording surface Pa of the recording paper P is set as the recording direction, and also calculates a second recording time taken for recording the image from the number of passes in which the ink-jet head 3 scans and the time taken for one pass when the short direction (second direction) of the recording surface Pa is set as the recording direction. Then, the recording direction deciding unit 54 decides the longitudinal direction of the recording surface Pa as the recording direction when the first recording time is shorter than the second recording time, and decides the short direction of the recording surface Pa as the recording direction when the second recording time is shorter than the first recording time, and then, outputs the signal regarding this recording direction to the head controller 51, the paper feeding controller 52, and the paper feeding roller selecting unit 55. At this time, the head controller 51 compares the recording direction decided by the recording direction deciding unit 54 and the inputted image data, selects whether to rotate the image data or not, aligns a longitudinal direction (short direction) of the image data with the longitudinal direction (short direction) of the fed recording paper P, and outputs the image data to the head driver 50.

According to the recording direction decided by the recording direction deciding unit 54, the paper feeding roller selecting unit 55 selects a paper feeding tray housing the recording paper P that is to be transported to the paper transport route 8, out of the first paper feeding tray 16 and the second paper feeding tray 17, and inputs the selection signal indicating that the paper feeding roller corresponding to the paper feeding tray is to be driven, to the paper feeding controller 52. As a result, the recording paper P fed by the driving of the selected paper feeding roller is transported to the ink-jet head 3 so that the recording direction with respect to the recording surface Pa matches the scanning direction of the inkjet head 3.

Figure 7A:
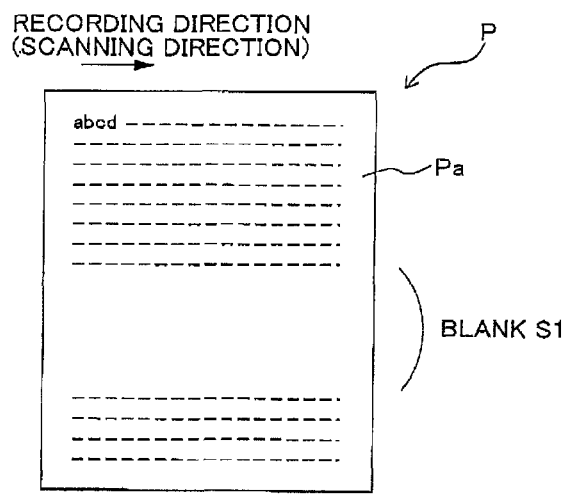
FIGS. 7A and 7B are views used to explain a direction of the recording paper relative to a scanning direction of the ink-jet head, FIG. 7A showing a case where the scanning direction of the ink-jet head is the short direction of the recording paper and FIG. 7B showing a case where the scanning direction of the ink-jet head is the longitudinal direction of the recording paper.

For example, when an image shown in FIG. 7A is recorded to the recording paper P, a blank S1 where no image is to be recorded all along the short direction of the recording paper P is formed long in the longitudinal direction, and it is assumed that the recording direction deciding unit 54 in the printer 1 determines that the recording time is shorter when the short direction, rather than the longitudinal direction, of the recording surface Pa is set as the recording direction and decides the short direction as the recording direction. Then, according to the recording direction decided by the recording direction deciding unit 54, the selection signal indicating that the first paper feeding roller 11 is to be driven is sent from the paper feeding roller selecting unit 55 to the paper feeding controller 52.

Then, the paper feeding controller 52 drives the drive motor 62 so that the first paper feeding roller 11 rotates and the recording paper P is fed from the first paper feeding tray 16 to the paper transport route 8, and the transport controller 53 drives the drive motor 64 so that the main roller 13 rotates and the recording paper P transported along the paper transport route 8 is transported to a position under the ink-jet head 3. At this time, the recording paper P fed from the first paper feeding tray 16 is transported, with the longitudinal direction of the recording surface Pa set parallel to the transport direction.

Then, the operation in which the head controller 51 sends the control signal, to the head driver 60 and the carriage drive motor 61, relating to the recording direction of the image data with respect to the recording surface Pa, to make the inkjet head 3 scan in the short direction of the recording surface Pa, and the operation in which the transport controller 53 sends the control signal, to the drive motor 64, relating to the recording direction of the image data with respect to the recording surface Pa, to transport the recording paper P in the transport direction by a predetermined amount are alternately repeated, so that a desired image is recorded to the recording surface Pa.

Figure 7B:
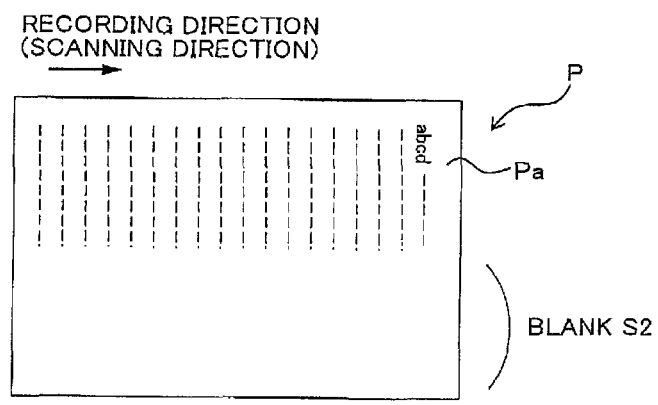

Further, when an image shown in FIG. 7B is recorded on the recording paper P, a blank S2 where no image is to be recorded all along the longitudinal direction of the recording paper P is sometimes formed long in the short direction, and it is assumed that the recording direction deciding unit 54 in the printer 1 determines that the recording time is shorter when the longitudinal direction, rather than the short direction, of the recording surface Pa is set as the recording direction and decides the longitudinal direction as the recording direction. Then, according to the recording direction decided by the recording direction deciding unit 54, the selection signal indicating that the second paper feeding roller 12 is to be driven is sent from the paper feeding roller selecting unit 55 to the paper feeding controller 52.

Then, the paper feeding controller 52 drives the drive motor 62 so that the second paper feeding roller 12 rotates and the recording paper P is fed from the second paper feeding tray 17 to the paper transport route 8, and the transport controller 53 drives the drive motor 64 so that the main roller 13 rotates and the recording paper P transported along the paper transport route 8 is transported to the position under the ink-jet head 3. The recording paper P fed from the second paper feeding tray 17 is transported so that the short direction of the recording surface Pa becomes the transport direction.

Then, the operation in which the head controller 51 sends the control signal, to the head driver 60 and the carriage drive motor 61, relating to the recording direction of the image data with respect to the recording surface Pa, to make the ink-jet head 3 scan back and forth in the longitudinal direction of the recording surface Pa, and the operation in which the transport controller 53 sends the control signal, to the drive motor 64, relating to the recording direction of the image data with respect to the recording surface Pa, to transport the recording paper P in the transport direction by a predetermined amount are alternately repeated, so that a desired image is recorded to the recording surface Pa.

According to the printer 1 of the present invention, based on the inputted image data, the recording direction deciding unit 54 decides the longitudinal direction of the recording surface Pa as the recording direction when the first recording time is shorter than the second recording time, and decides the short direction of the recording surface Pa as the recording direction when the second recording time is shorter than the first recording time. Then, the paper feeding tray housing the recording paper P that is to be transported to the paper transport route 8 is selected from the two paper feeding trays 16, 17 in which the recording papers P are housed in different directions, and the recording paper P is fed to the paper transport route 8 from the selected paper feeding tray, so that an image is recorded to the recording surface Pa of the recording paper P while conforming the recording direction of the recording surface Pa to the scanning direction of the ink-jet head 3. Consequently, it is possible to make the ink-jet head 3 scan in the optimum recording direction corresponding to the shorter recording time, according to the image data, which enables high-speed image recording on the recording surface Pa of the recording paper P whatever image data is. Further, the recording time taken for this image recording can be easily calculated from the time taken for one pass and the number of passes in which the ink-jet head 3 scans.

Further, according to the recording direction corresponding to the shorter recording time to the recording surface Pa, the paper feeding tray is selected from the two paper feeding trays 16, 17, and the recording paper P is fed from the selected paper feeding tray to the ink-jet head 3. Therefore, the scanning direction of the ink-jet head 3 can be fixed in one predetermined direction. Further, it is possible to change the direction of the recording paper P fed to the ink-jet head 3 without any need for a complicated mechanism for changing the direction of the recording paper P.

Next, a second embodiment of the present invention will be explained with reference to FIG. 8. In the first embodiment, the direction of the recording paper P transported to the paper transport route 8 under the ink-jet head 3 is changed depending on whether the recording paper P is fed from the first paper feeding tray 16 or the second paper feeding tray 17. However, in the second embodiment, only one paper feeding tray houses recording papers P, and the direction of the recording paper P is changed in a paper transport route 8 before the recording paper P is transported to a position under an ink-jet head 3. In this embodiment, a structure for changing the direction of the recording paper P transported to the paper transport route 8 under the ink-jet head 3 will be explained in detail. The other structure is the same as that of the first embodiment, and therefore, an explanation thereof will be omitted. What are the same as those of the first embodiment will be denoted by the same reference numerals and symbols, and an explanation thereof will be omitted.

Figure 8A:
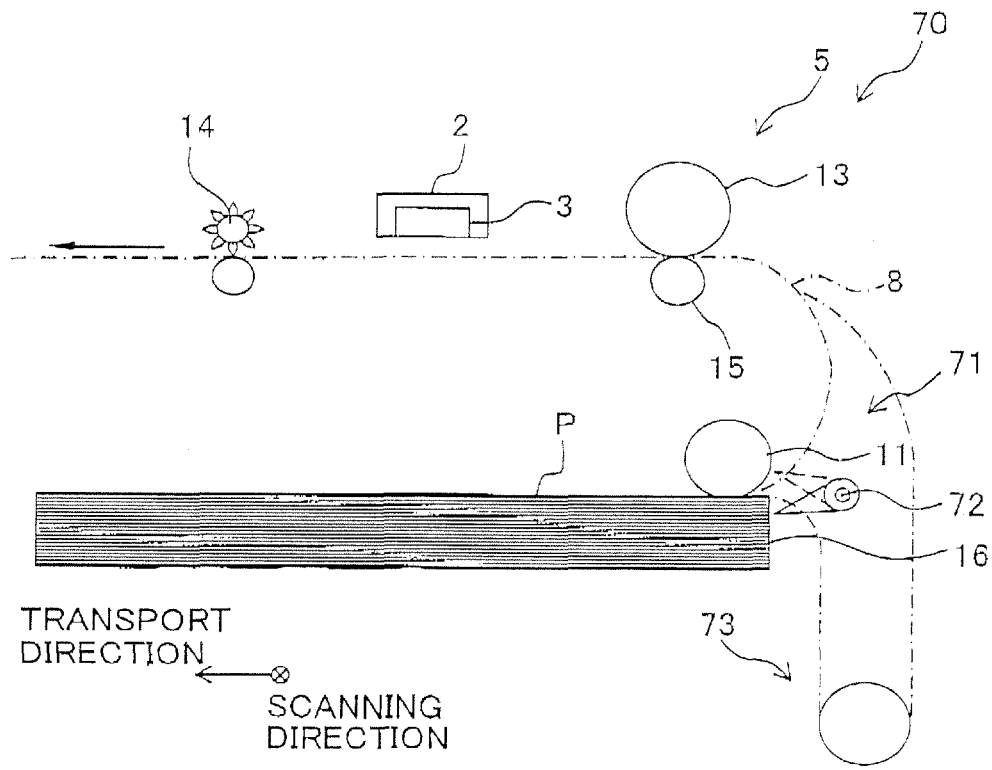
FIG. 8A is a side view showing a schematic structure of a printer according to a second embodiment.
Figure 8B:
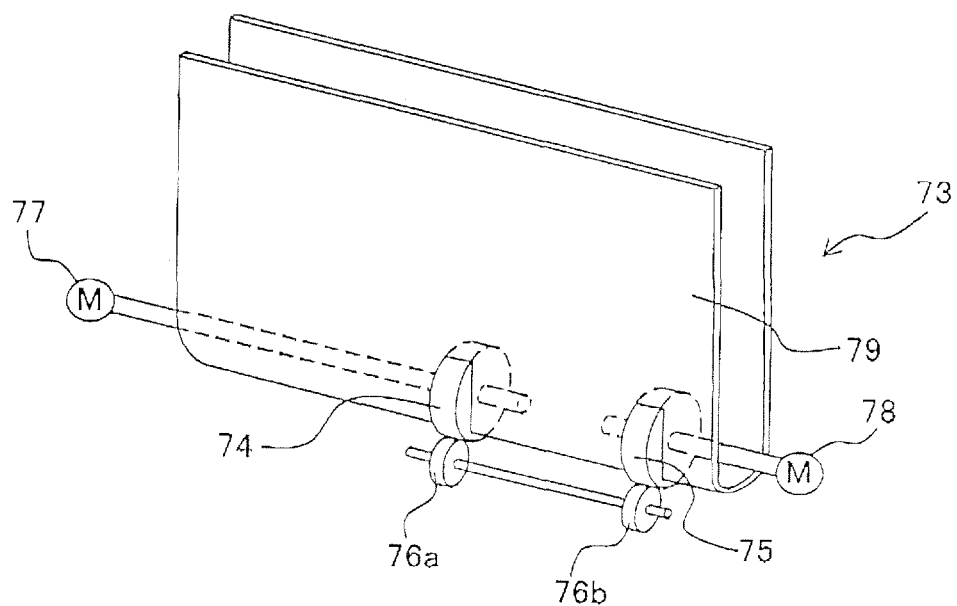
FIG. 8B is a perspective view of a paper direction changing mechanism.

As shown in FIG. 8A, a printer 70 according to this embodiment includes a paper feeding mechanism 71 in place of the paper feeding mechanism 9 of the first embodiment, and as a new structure, includes a paper direction changing mechanism 73 (feeding direction changing mechanism).

The paper feeding mechanism 71, which is disposed under a transport mechanism 5, includes a paper feeding tray 16 capable of housing a plurality of stacked recording papers P, a paper feeding roller 11 which sends out the recording paper P from the paper feeding fray 16, a drive motor (not shown) which drives the roller 11, a swinging mechanism 72 changing a guide direction of the recording paper P, and so on, and it feeds the recording paper P to the paper transport route 8.

In the paper feeding tray 16, the recording papers P whose short direction is set parallel to an axis of the paper feeding roller 11 are housed, and when the first paper feeding roller 11 comes into contact with the uppermost recording paper P out of the recording papers P housed in the paper feeding tray 16 while rotating, the recording paper P is fed to the paper transport route 8. At this time, when the swinging mechanism 72 swings to the solid line position by being driven by a drive motor (not shown), the fed recording paper P is transported along the paper transport route 8, with its longitudinal direction set parallel to a transport direction, so that the short direction of the recording paper P becomes a recording direction. Further, when the swinging mechanism 72 swings to the broken-line position, the fed recording paper P is transported to the paper direction changing mechanism 73 along the paper transport route 8, with its longitudinal direction set parallel to the transport direction.

The paper direction changing mechanism 73 includes two rollers 74, 75 disposed coaxially, drive motors 77, 78 which drive the two rollers 74, 75 respectively, a guide member 79, and so on, and changes the direction of the transported recording paper P by 90 degrees to transport the recording paper P to the paper transport route 8.

The two rollers 74, 75 are rotatably supported by different shafts respectively, and rotate at different rotation speeds by being driven by the drive motors 77, 78. Two driven rollers 76a, 76b rotatably supported by a same shaft are in contact with the two rollers 74, 75 with the paper transport route 8 sandwiched therebetween.

In this embodiment, the drive motors 77, 78 are controlled so that a rotation speed of the roller 74, becomes higher than a rotation speed of the roller 75. Consequently, after the recording paper P transported to the paper direction changing mechanism 73 moves toward the two rollers 74, 75 along the guide member 79, the recording paper P is sent out by a greater amount by the roller 75 than by the roller 74, so that the recording paper P swings while being transported and changes its direction by 90 degrees. Then, the recording paper P transported from the paper direction changing mechanism 73 is transported along the paper transport route 8, with its short direction set parallel to the transport direction, so that the longitudinal direction of the recording paper P becomes the recording direction.

As described above, the recording paper P transported from the paper feeding tray 16 directly to the position under the ink-jet head 3 without passing through the paper direction changing mechanism 73 is transported with its longitudinal direction set parallel to the transport direction, so that the image is recorded on the recording surface Pa while conforming the short direction of the recording paper P to the scanning direction of the ink-jet head 3. Further, the recording paper P transported from the paper feeding tray 16 to the position under the ink-jet head 3 via the paper direction changing mechanism 73 is changed in its direction by 90 degrees by the paper direction changing mechanism 73 and transported, with its short direction set parallel to the transport direction, so that an image is recorded on the recording surface Pa while conforming the longitudinal direction of the recording paper P to the scanning direction of the ink jet head 3. Incidentally, the structure to change the direction of the recording paper P by 90 degrees by the paper direction changing mechanism 73 is conventionally known as described in, for example, Japanese Patent Application Laid-open No. 05-330699 and so on, and therefore, refer to this publication for more detailed explanation.

In the printer 70 in the second embodiment, the use of the swinging mechanism 72 and the paper direction changing mechanism 73 also makes it possible to conform the recording direction with respect to the recording surface Pa of the recording paper P to the scanning direction of the ink-jet head 3, while fixing the scanning direction of the ink jet head 3 in one predetermined direction, and the same effect as that of the printer 1 in the first embodiment can be produced. Further, since only one paper feeding tray 16 is necessary, the printer 70 can be made compact. Note that the swinging mechanism 72 and the paper direction changing mechanism 73 in this embodiment correspond to a changing unit in the present invention.

Figure 9:
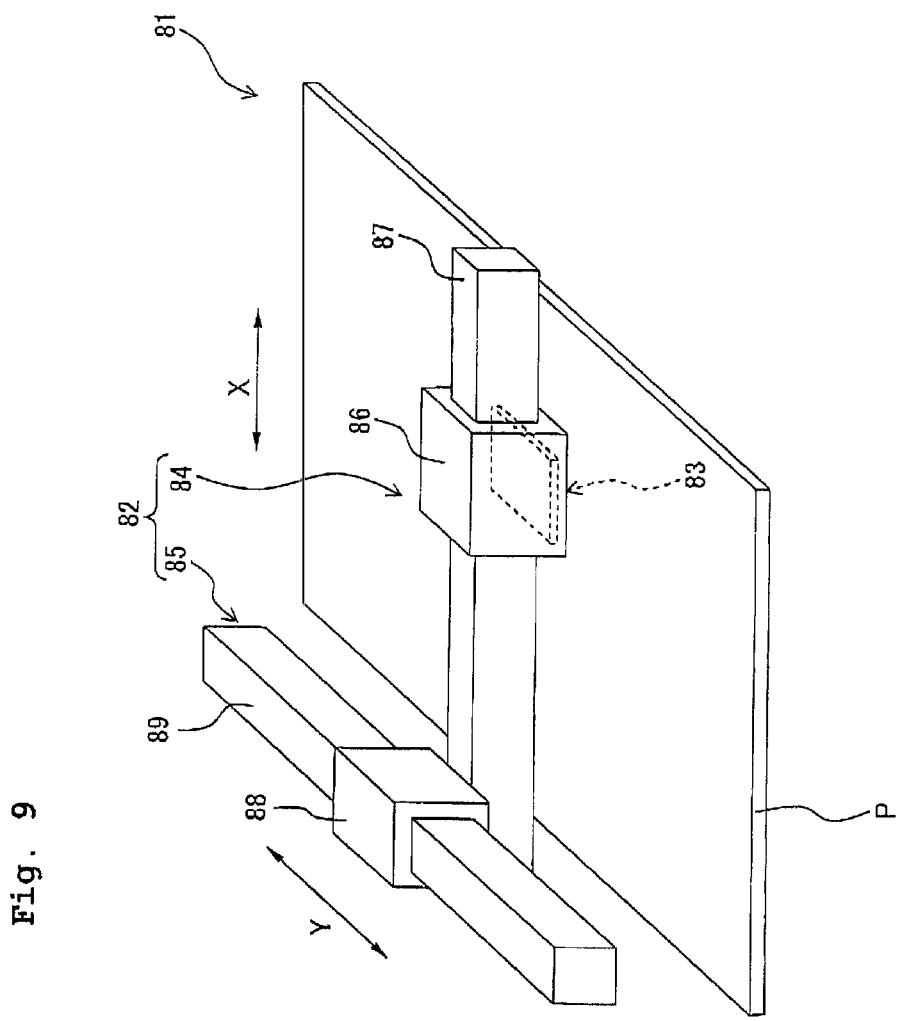
FIG. 9 is a perspective view showing a schematic structure of a printer in a modified example.

Next, modified examples where various changes are made to the embodiments will be explained. Those having the same structures as those of the above-described embodiments are denoted by the same reference numerals and symbols, and an explanation thereof will be omitted when appropriate. In the above-described embodiments, by changing the direction of the recording paper P, the recording direction with respect to the recording surface Pa of the recording paper P is conformed to the scanning direction of the ink jet head 3 and then the recording paper P is transported to the ink-jet head 3 which is capable of scanning only in one predetermined scanning direction. However, the scanning direction of the ink-jet head 3 may be conformed to the recording direction with respect to the recording surface Pa of the recording paper P in the following manner. That is, instead of changing the direction of the recording paper P, the ink-jet head 3 is configured to be movable in two directions relative to the recording paper P. For example, as shown in FIG. 9, a printer 81 includes a head moving mechanism 82 (scanning mechanism) which moves an ink-jet head 83 in a predetermined X direction (first scanning direction) and in a Y direction (second scanning direction) perpendicular to the X direction, a transport mechanism (not shown) disposed under the head moving mechanism 82 and transporting a recording paper P whose longitudinal direction is set parallel to the Y direction, and so on.

The head moving mechanism 82 has an X-direction moving mechanism 84 (first scanning mechanism) which drives the ink-jet head 83 in the X direction and a Y-direction moving mechanism 85 (second scanning mechanism) which drives the ink-jet head 83 in the Y direction. The X-direction moving mechanism 84 includes: an X-direction movable body 86 having a lower surface on which the ink-jet head 83 is mounted; and a guide member 87 which guides the X-direction movable body 86 in the X direction, and it moves the ink-jet head 83 and the X-direction movable body 86 integrally in the X direction by driving the X-direction movable body 86 along the guide member 87 by a motor (not shown) or the like. Further, the Y-direction moving mechanism 85 includes a Y-direction movable body 88 coupled to the guide member 87 of the X-direction moving mechanism 84 and a guide member 89 guiding the Y-direction movable body 88 in the Y direction, and it moves the ink-jet head 83 and the X-direction moving mechanism 84 (the X-direction movable body 86 and the guide member 87) in the Y direction by driving the Y-direction movable body 88 along the guide member 89 by a motor (not shown) or the like. There is further provided a head rotating mechanism (not shown) rotating the ink-jet head 3 in parallel to a plane direction of a nozzle plate on which nozzles 35 are formed.

With this structure, it is possible to make the ink-jet head 83 scan in the short direction of the recording surface Pa of the recording paper P by stopping the movement of the Y-direction movable body 88 and moving the X-direction movable body 86 in the X direction while stopping the recording paper P transported by the transport mechanism with its longitudinal direction set parallel to the transport direction (Y direction) at a position under the head moving mechanism 82. Further, it is possible to make the ink-jet head 83 scan in the longitudinal direction of the recording surface Pa of the recording paper P by stopping the movement of the X-direction movable body 86 and moving the Y-direction movable body 88 in the Y direction. Thus, by using the head moving mechanism 82, it is possible to conform the scanning direction of the ink-jet head 8 to the recording direction of the recording surface Pa of the recording paper P. At this time, when the X-direction movable body 86 is moved in the X direction to make the ink-jet head 83 scan in the short direction of the recording surface Pa of the recording paper P, the head rotating mechanism rotates the ink-jet head 3 so that the direction of nozzle rows in which the nozzles 35 are arranged becomes perpendicular to the X direction, and when the Y-direction movable body 88 is moved in the Y direction to make the ink-jet head 83 scan in the longitudinal direction of the recording surface Pa of the recording paper P, the head rotating mechanism rotates the ink-jet head 3 so that the direction of the aforesaid nozzle rows becomes perpendicular to the Y direction.

Alternatively, the ink jet printer 1 according to the first embodiment may be provided with a scanning direction changing mechanism which changes the scanning direction of the carriage 2 and the ink-jet head 3 to conform the scanning direction to the recording direction decided by the recording direction deciding unit 54 by changing the extending direction of the guide shafts 18 and 19 along which the carriage 2 reciprocates. For example, the scanning direction changing mechanism may be provided with a rotating mechanism which rotates the guide shafts 18 and 19 along the recoding surface Pa of the recording paper P with one end of the shaft 19 being a rotation center.

Further, in the above-described second embodiment, by using the swinging mechanism 72 and the paper direction changing mechanism 73, the direction of the recording paper P fed from the paper feeding tray 16 is changed in the paper transport route 8 and the recording direction to the recording surface Pa of the recording paper P is conformed to the scanning direction of the ink-jet head 3. However, the paper feeding tray 16 may be formed to be rotatable in parallel to the plane direction, and the recording direction with respect to the recording surface Pa of the recording paper P may be conformed to the scanning direction of the ink-jet head 3 at a stage when the recording paper P is fed to the paper transport route 8, by rotating the paper feeding tray 16 according to the recording direction decided by the recording direction deciding unit 54. Alternatively, without the paper feeding tray 16 being rotated, only the housed recording paper may be rotated in the paper feeding tray 16 in parallel to its plane direction.

Further, in the above-described embodiments, the recording surface Pa of the recording paper P to which an image is recorded is in a rectangular shape, but the present invention is also applicable to a recording surface in a flat surface shape other than the rectangular shape. However, when the recording time taken for the image recording is calculated, the time taken for a pass differs depending on a scanned area, and therefore, the time taken for one pass needs to be calculated for each area.

Further, in this embodiment, as a factor which makes the recording time differ depending on the recording direction, an area in which no image is to be recorded all along the scanning direction of the ink-jet head 3 across the recording surface Pa is formed as a blank. That is, in the explanation, the example is taken where, when there is an area in which no dot is to be formed by the ink jetted from the ink-jet head 3, the ink-jet head 3 skips the scanning without performing a pass for the area. However, the recording time changes depending on the recording direction with respect to the recording surface Pa in the following case other than the above case. When a formed image is biased toward one end of the recording paper P, instead of making the ink-jet head 3 scan along the whole width of the recording paper P, the scanning direction of the ink-jet head 3 is reversed at an instant when, in the scanning direction, no dot needs to be formed by the jetted ink, whereby the time taken for one pass is shortened. At this time, the time taken for one pass changes and the recording time taken for the image recording changes.

Figure 10:
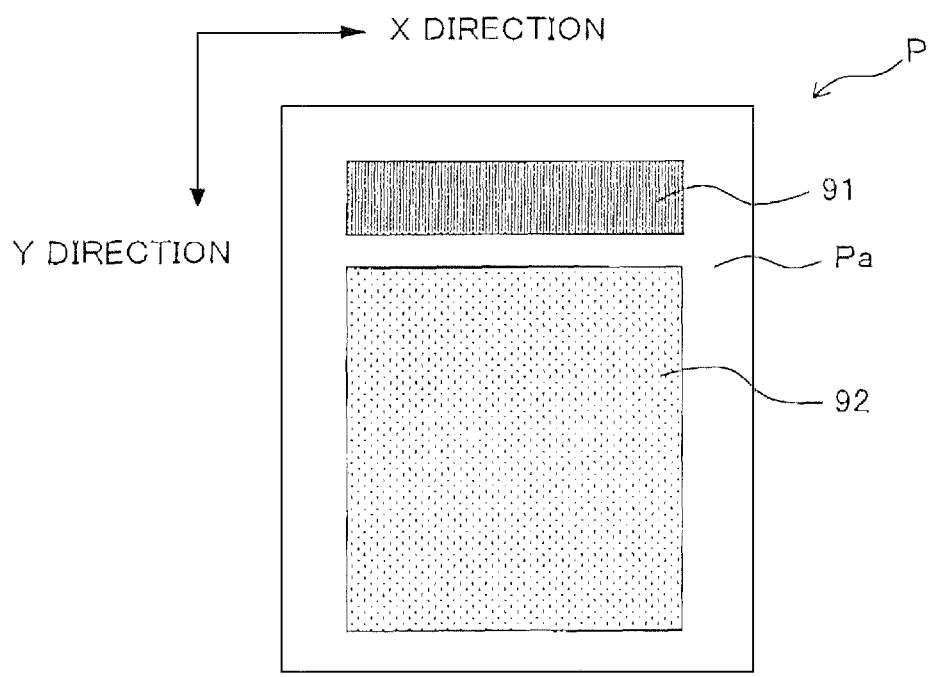
FIG. 10 is a view used to explain a recording time in the modified example.

Further, as described above, the speed during the uniform-speed scanning by the ink-jet head 3 is decided by resolution of an image and a jetting cycle of the ink jetted from the ink-jet head 3, and for example, under the constant jetting cycle, the higher the resolution, the lower the speed and the longer the time taken for one pass. Further, when the scanning speed of the ink-jet head 3 is changed in one pass, it is difficult to maintain continuity of printing quality at a point where the speed changes, and therefore the scanning speed of the ink-jet head 3 is constant in one pass. Here, it is assumed, for example, that an image area 91 having a uniform resolution all along the short direction and an image area 92 arranged alongside of the image area 91 in the longitudinal direction, having a uniform resolution all along the short direction, and having the resolution lower than that of the image area 91 are recorded on the recording surface Pa of the recording paper P, as shown in FIG. 10. At this time, when the ink-jet head 3 scans in the Y direction, the speed during the uniform-speed scanning is set to the speed for the image area 91 with the higher resolution, resulting in a longer time taken for one pass. On the other hand, when the ink-jet head 3 scans in the X direction, it is possible to set the speed during the uniform-speed scanning to the speed for the image area 92 with the lower resolution, in an area where only the image area 92 with the lower resolution all along the short direction is recorded, which makes it possible to shorten the time taken for one pass in this area. Therefore, when image areas different in resolution are arranged in the longitudinal direction as described above, in some cases, the short direction scanning by the ink-jet head 3 requires a shorter recording time, leading to higher-speed image recording than the longitudinal-direction scanning by the ink-jet head 3. As described above, the recording direction enabling the high-speed image recording differs depending on local resolution of the image.

Further, in the above described first and second embodiments and modified examples, the recording direction deciding unit 54 decides the longitudinal direction of the recording surface Pa as the recording direction when the first recording time is shorter than the second recording time, and decides the short direction of the recording surface Pa as the recording direction when the second recording time is shorter than the first recording time. However, the two directions for which the recording time is calculated need not be perpendicular to each other with respect to the plane direction of the recording surface Pa but only need to intersect with each other. At this time, by conforming the intersecting two directions of the recording surface Pa to the scanning direction of the ink-jet head 3 and the transport direction of the transport mechanism 5, respectively, it is possible to produce the same effect as that of the above-described embodiments.

According to the above-described first and second embodiments and modified examples, in some cases, the recording paper P on which an image, characters, and so on are recorded is transported in the longitudinal direction of the recording paper P to be discharged and in other cases is transported in the short direction of the recording paper P to be discharged, depending on recorded image data. Therefore, when characters, an image, and so on are recorded to a plurality of recording papers P, the directions of the recording papers P stacked on the discharge tray are not sometimes the same. Therefore, the paper direction changing mechanism in the second embodiment, for instance, may be provided between the spur roller 14 and the discharge tray so as to make the directions of the recording papers P discharged to the discharge tray uniform. In this case, the directions of the recording papers P discharged to the discharge tray may all be the direction of the recording paper P first discharged to the discharge tray, or may all be a direction in which a greater number of the recording papers P are discharged out of the recording papers P discharged in the longitudinal direction and the recording papers P discharged in the short direction.

In the foregoing, the explanation is given of the mode where input image data has a blank area for which no dot is formed, but the present invention is also applicable to a case where an image recording area on which an image is recorded based on image data is small relative to the recording surface Pa of the recording paper P and thus an area other than the image recording area becomes a blank area, as a margin, in which no dot is funned, as a result of the image recording.

The embodiments and modified examples thereof explained above are examples where the present invention is applied to the ink-jet printer including the ink-jet head scanning back and forth in the scanning direction, but the present invention is also applicable to an image recording apparatus of other recording system, provided that it is a printer including a recording head scanning back and forth in the scanning direction.

What is claimed is:

1. An image recording apparatus which records an image on a recording medium, the apparatus comprising:
   a recording head which records the image to a recording surface of the recording medium;
   a scanning mechanism which makes the recording head scan along a scanning direction;
   a recording direction deciding unit which decides a recording direction along which the recording head scans with respect to the recording surface of the recording medium to record the image, from a first direction along the recording surface and a second direction intersecting with the first direction and along the recording surface;
   a changing unit which changes one of the scanning direction of the recording head and a direction of the recording medium to bring the recording direction with respect to the recording surface decided by the recording direction deciding unit and the scanning direction of the recording head in line; and
   a controller which is configured to:
      control the scanning mechanism so that scanning speed of the recording head is constant in each of scanning passes required for recording the image; and
      decide the scanning speed of the recording head based on a resolution of the image so that the scanning speed is lowered as the resolution of the image is increased;
   wherein the recording direction deciding unit calculates a first recording time taken for recording the entire image when the first direction is set as the recording direction and a second recording time taken for recording the entire image when the second direction is set as the recording direction, based on image data of the image to be recorded on the recording surface of the recording medium; and
   wherein the recording direction deciding unit decides the first direction as the recording direction when the first recording time is shorter than the second recording time, and decides the second direction as the recording direction when the second recording time is shorter than the first recording time;
   wherein, under a condition that there are a first area having a first resolution and a second area having a second resolution which is higher than the first resolution in one scanning pass. the controller is configured to decide the scanning speed of the recording head for the one scanning pass based on only the second resolution of the second area, and, wherein the controller is configured to decide the speed based on the first resolution of the first area under the condition that only the first area is recorded in one scanning pass.

2. The image recording apparatus according to claim 1, wherein the recording direction deciding unit calculates the first recording time based on the number of passes on which the recording head scans and a time taken for one pass when the first direction of the recording surface is set as the recording direction, and the second recording tithe from the number of passes on which the recording head scans and a time taken for one pass when the second direction of the recording surface is set as the recording direction.

3. The image recording apparatus according to claim 1, further comprising:
   a first feeding tray which accommodates the recording medium so that the recording medium is fed to the recording head in the first direction of the recording surface;
   a second feeding tray which accommodates the recording medium so that the recording medium is fed to the recording head in the second direction of the recording surface; and
   a feeding mechanism which feeds the recording medium from the first and second feeding trays to the recording head;
   wherein the changing unit selects one of the first and second feeding trays based on the recording direction decided by the recording direction deciding unit, and the feeding mechanism feeds the recording medium from the selected feeding tray selected by the changing unit.

4. The image recording apparatus according to claim 1, further comprising:
   a feeding tray which accommodates the recording medium;
   a feeding mechanism which feeds the recording medium from the feeding tray to the recording head; and
   a feeding direction changing mechanism which changes a feeding direction of the recording medium with respect to the recording head, according to the recording direction decided by the recording direction deciding unit.

5. The image recording apparatus according to claim 1, further comprising:
   a scanning direction changing mechanism which changes the scanning direction of the recording head to conform the scanning direction to the recording direction decided by the recording direction deciding unit.

6. The image recording apparatus according to claim 1;
   wherein the scanning mechanism includes a first scanning mechanism which makes the recording head scan along a predetermined first scanning direction and a second scanning mechanism which makes the recording head scan along a second scanning direction which intersects with the first scanning direction.

7. The image recording apparatus according to claim 6; further comprising:
   a head rotating mechanism which rotates the recording head.

8. The image recording apparatus according to claim 1;
   wherein the recording medium is a rectangular recording paper having long sides and short sides.

9. The image recoding apparatus according to claim 8;
   wherein the first direction is a direction along the long sides of the recording paper and the second direction is a direction along the short sides of the recording paper.

10. The image recording apparatus according to claim 1;
    wherein the first direction and the second direction are perpendicular to each other.

11. The image recording apparatus according to claim 1;
    wherein the recording direction deciding unit calculates:
    the number of scanning passes of the recording head required for recording the image when the first direction is set as the recording direction; and
    the number of scanning passes of the recording head required for recording the image when the second direction is set as the recording direction.

* * * * *